(12) United States Patent
Yu

(10) Patent No.: US 6,661,366 B2
(45) Date of Patent: Dec. 9, 2003

(54) ADAPTIVE DIGITAL SUB-ARRAY BEAMFORMING AND DETERMINISTIC SUM AND DIFFERENCE BEAMFORMING, WITH JAMMING CANCELLATION AND MONOPULSE RATIO PRESERVATION

(75) Inventor: Kai-Bor Yu, Niskayuna, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/882,348

(22) Filed: Jun. 15, 2001

(65) Prior Publication Data

US 2003/0020646 A1 Jan. 30, 2003

(51) Int. Cl.[7] .............................. G01S 7/36; G01S 13/44
(52) U.S. Cl. .............................. 342/17; 342/13; 342/16; 342/74; 342/75; 342/80; 342/147; 342/149; 342/159; 342/175
(58) Field of Search .................. 342/13–20, 73–81, 342/89, 149–154, 159–164, 175, 195, 378–384, 147, 148

(56) References Cited

U.S. PATENT DOCUMENTS

| 4,214,244 | A |   | 7/1980  | McKay et al.      |        |
|-----------|---|---|---------|-------------------|--------|
| 4,225,870 | A |   | 9/1980  | Malrner et al.    |        |
| 4,298,873 | A |   | 11/1981 | Roberts           |        |
| 4,555,706 | A |   | 11/1985 | Haupt             |        |
| 4,672,378 | A | * | 6/1987  | Drabowitch et al. | 342/17 |
| 5,173,702 | A | * | 12/1992 | Young et al.      | 342/17 |
| 5,185,608 | A | * | 2/1993  | Pozgay            | 342/17 |
| 5,371,506 | A |   | 12/1994 | Yu et al.         |        |
| 5,515,060 | A |   | 5/1996  | Hussain et al.    |        |
| 5,592,178 | A | * | 1/1997  | Chang et al.      | 342/154 |
| 5,600,326 | A |   | 2/1997  | Yu et al.         |        |
| 6,084,540 | A |   | 7/2000  | Yu                |        |
| 6,087,974 | A |   | 7/2000  | Yu                |        |

OTHER PUBLICATIONS

Hans Steyskal, "Digital Beamforming Antennas, An Introduction," Microwave Journal, Jan. 1987, pp. 107–124.

Hans Steyskal and John F. Rose, "Digital Beamforming for Radar Systems," Microwave Journal, Jan. 1989, pp. 121–136.

* cited by examiner

Primary Examiner—Bernarr E. Gregory
(74) Attorney, Agent, or Firm—Duane Morris LLP

(57) ABSTRACT

A radar system and technique provide the capability to detect a target of interest and maintain the detection in the presence of multiple mainlobe and sidelobe jamming interference. The system and technique utilize digital beamforming to form sub-arrays for canceling jamming interference. Jamming is adaptively suppressed in the sub-arrays prior to using conventional deterministic methods to form the sum, $\Sigma$, and difference, $\Delta$, beams for monopulse processing. The system and technique provide the ability to detect a target of interest, provide an undistorted monopulse ratio, m, and maintain target angle estimation, in the presence of multiple mainlobe and multiple sidelobe jammers.

15 Claims, 5 Drawing Sheets

ADAPTIVE DIGITAL SUB-ARRAY BEAMFORMING AND DETERMINISTIC SUM AND DIFFERENCE BEAMFORMING, WITH JAMMING CANCELLATION AND MONOPULSE RATIO PRESERVATION

FIELD OF THE INVENTION

This invention generally relates to radar systems and techniques for determining the angular location of a target and specifically to a monopulse radar processing system and technique for maintaining the accuracy of the monopulse ratio in the presence of multiple mainlobe jammers and multiple sidelobe jammers.

BACKGROUND

One of the problems facing surveillance and fire control radar systems today is target detection and estimation of target angle in the presence of severe jamming interference. This problem is particularly important for next generation radar systems used in missile defense. Recently, interest has been generated toward a goal of implementing radar systems in airborne and spaceborne platforms for large area surveillance. A problem associated with achieving this goal is developing a radar system capable of detecting targets while rejecting unwanted information such as jammers and clutter.

Radar systems implementing antenna arrays typically form beam patterns comprising a central beam, i.e., main lobe, and surrounding minor lobes, i.e., sidelobes. Typically, it is desired to have a narrow mainlobe having high gain, and low sidelobes. To detect a desired target and reject unwanted clutter and jamming, the mainlobe is steered toward the target of interest. The desired target within the mainlobe is enhanced and the response to clutter and jamming outside the mainlobe is attenuated. However, if a jammer is located within the mainlobe, it becomes difficult to detect the target of interest. This problem is exacerbated in the situation where multiple jammers exist.

Radar systems have been developed to cancel a single jammer in the mainlobe. Such a system is described in U.S. Pat. No. 5,600,326 issued to Yu et al., which is incorporated herein by reference in its entirety. However, these systems require a priori knowledge of the jammer location. Thus, a need exists for a radar system having the ability to detect a target of interest in the presence of multiple mainlobe jammers. A need also exists for a radar system having the capability to cancel multiple mainlobe jammers without requiring a priori knowledge of jammer locations. Further, a need exists for a radar system having the capability to detect a target of interest in the presence of multiple mainlobe and multiple sidelobe jammers.

SUMMARY OF THE INVENTION

A radar system for detecting and maintaining a detection of a target of interest in the presence of interference includes an antenna array, a summer, a sub-array beamformer, and a monopulse processor. Antenna array element data are provided to the summer to form a plurality of sub-arrays. The sub-array data are provided to the sub-array beamformer for forming respective sub-array beam patterns. The monopulse processor includes a monopulse sum-difference beamformer and a monopulse ratio former. The monopulse sum-difference beamformer forms sum and difference beams from the sub-array beam patterns, and the monopulse ratio former forms at least one monopulse ratio from the sum and difference beams.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

Figure 1:
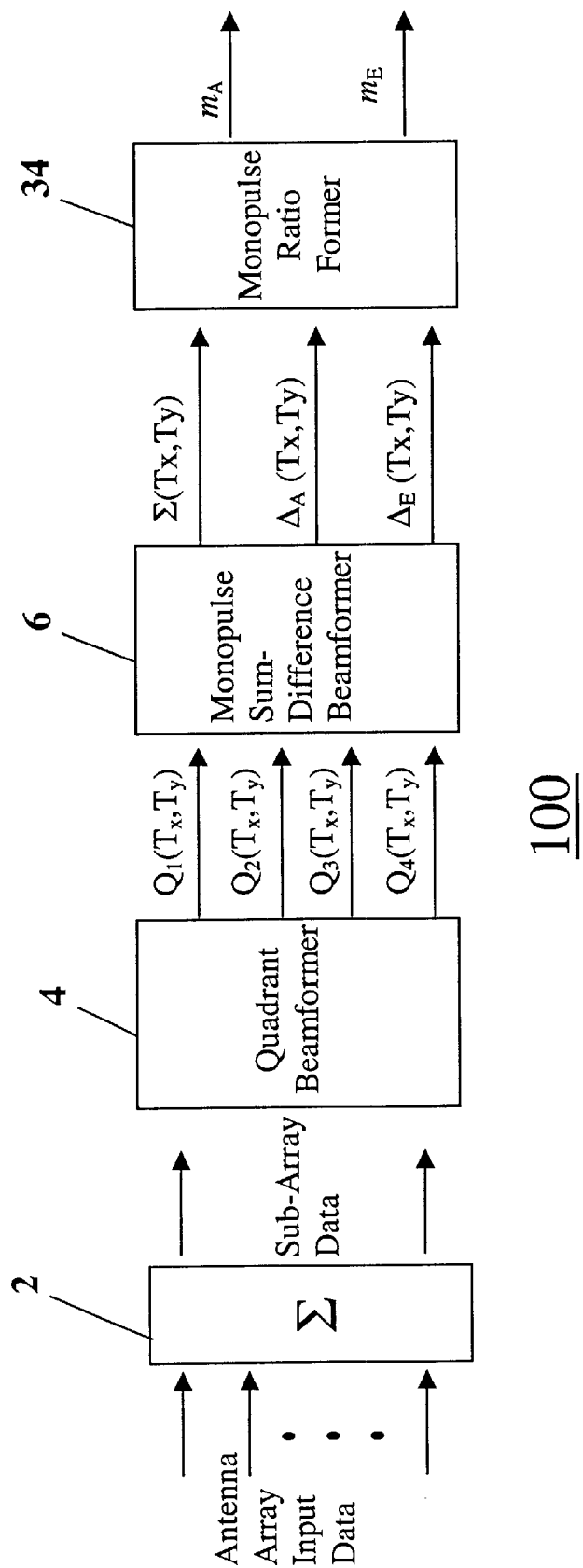
FIG. 1 is a block diagram of an exemplary monopulse sub-array sum-difference beamformer.

Monopulse radar processing is a radar processing technique in which the angular location of a target (also referred to as direction of arrival) can be determined within fractions of a beamwidth by comparing measurements received from two or more simultaneous beams. This technique for estimating the direction of arrival (DOA) of a target is often implemented in surveillance and tracking radar systems comprising a phased array antenna and a digital beamforming (DBF) processor. Typically, one beam is formed for transmission and two beams are formed upon reception for angle measurement. The term monopulse refers to the fact that the echo from a single transmitted pulse returning from a target is used to measure the angle of the target.

Monopulse processing may be implemented for a linear array of N antenna elements which provides respective signals $x(0), \ldots, x(N-1)$ to a beamforming network. The output signals of the beamforming network are the sum, $\Sigma$, and difference, $\Delta$, signals which are processed to generate an output signal, $\theta$, representing the estimated direction of arrival. The sum beam pattern has a symmetrical amplitude profile with respect to its maximum at the boresight, and the difference beam pattern has an antisymmetrical amplitude profile with respect to a zero response at the boresight. In the beamforming network, each of the N input signals is split into two paths, linearly weighted, and then added together. The DOA of a target signal is determined by evaluating (e.g., from a look up table or from a graph) the ratio of the difference signal over the sum signal, as indicated by the following equation.

$$m = \frac{\Delta}{\Sigma} \tag{1}$$

where m is referred to as the monopulse ratio.

Monopulse processing may also be implemented for planar arrays in which the target azimuth and elevation angles are of interest. In this case the sum and difference signals represent sum and difference signals for angles in elevation and azimuth. These angles are represented by the following symbols: $\Delta_E$ represents the difference signal in elevation, $\Delta_A$ represents the difference signal in azimuth, $\Sigma$ represents the sum signal in elevation as well as in azimuth.

In an exemplary embodiment of the invention, the accuracy of the monopulse ratio, m, is maintained in the presence of multiple mainlobe and multiple sidelobe interference (e.g., caused by multiple jammers). The accuracy of the monopulse ratio, m, is maintained by adaptively suppressing the interference before forming the monopulse sum and difference output beams. Sub-arrays are formed using digital beamforming, DBF. Beam patterns are formed for each sub-array and jamming interference is cancelled for each sub-array by steering beam pattern nulls at the interference. The sub-array beam patterns are then used to form the sum, $\Sigma$, and difference, $\Delta$, beams to determine the target DOA. Thus, unbiased angle estimation is achieved by exploiting the available degrees of freedom across the aperture while jamming is canceled in the sub-arrays.

FIG. 1 is a block diagram of an exemplary monopulse sub-array sum-difference beamformer 100. Antenna array data are digitally summed by summer 2, to form a number, N, of overlapped sub-arrays. The amount of overlap may vary and is determined by factors such as the beamwidth of the mainlobe and available degrees of freedom in the aperture. Monopulse processing performance, as measured by the monopulse ratio, m, is determined, in part, by sub-array separation. In an exemplary embodiment of the invention, the array is partitioned into quadrants for forming respective quadrant beams in sub-array beamformer 4. The sub-array quadrant beams are denoted by $Q_1(T_x,T_y)$, $Q_2(T_x,T_y)$, $Q_3(T_x,T_y)$, and $Q_4(T_x,T_y)$, located at $(D_x,D_y)$, $(-D_x,D_y)$, $(-D_x,-D_y)$, and $(D_x,-D_y)$, respectively, with respect to the center of the array. $T_x$ and $T_y$ denote the conventional directional cosines, representing azimuth angle ($\theta_{AZ}$) and elevation angle ($\theta_{EL}$) information, respectively. Thus:

$$T_x = \cos(\theta_{EL})\sin(\theta_{AZ}), \text{ and} \quad (2)$$

$$T_y = \sin(\theta_{EL}). \quad (3)$$

The quadrant beams differ from each other in phase. The quadrant beams are represented by the following equations.

$$Q_1(T_x, T_y) = Q(T_x, T_y) e^{\frac{j2\pi}{\lambda}(T_x D_x + T_y D_y)} \quad (4)$$

$$Q_2(T_x, T_y) = Q(T_x, T_y) e^{\frac{j2\pi}{\lambda}(-T_x D_x + T_y D_y)} \quad (5)$$

$$Q_3(T_x, T_y) = Q(T_x, T_y) e^{\frac{j2\pi}{\lambda}(-T_x D_x - T_y D_y)} \quad (6)$$

$$Q_4(T_x, T_y) = Q(T_x, T_y) e^{\frac{j2\pi}{\lambda}(T_x D_x - T_y D_y)} \quad (7)$$

where $Q(T_x,T_y)$ is a common sub-array beam located at the center of the array, $\lambda$ is the wavelength of the transmitted radar pulse, and $D_x$ is the distance between the center of the sub-array and the center of the array in the x direction to (azimuth), in meters, and $D_y$ is the distance between the center of the sub-array and the center of the array in the y direction (elevation), in meters. The quadrant beams are summed, by the monopulse sum-difference beamformer 6, to form the sum, $\Sigma(T_x,T_y)$, azimuth difference, $\Delta_A(T_x,T_y)$, and elevation difference, $\Delta_E(T_x,T_y)$, outputs in accordance with the following equations.

$$\sum(T_x, T_y) = Q_1(T_x, T_y) + Q_2(T_x, T_y) + Q_3(T_x, T_y) + Q_4(T_x, T_y) \quad (8)$$

$$= Q(T_x, T_y) 4 \cos\left(\frac{2\pi}{\lambda} T_x D_x\right) \cos\left(\frac{2\pi}{\lambda} T_y D_y\right)$$

$$\Delta_A(T_x, T_y) = Q_1(T_x, T_y) - Q_2(T_x, T_y) - Q_3(T_x, T_y) + Q_4(T_x, T_y) \quad (9)$$

$$= Q(T_x, T_y) 4 j \sin\left(\frac{2\pi}{\lambda} T_x D_x\right) \cos\left(\frac{2\pi}{\lambda} T_y D_y\right)$$

$$\Delta_E(T_x, T_y) = Q_1(T_x, T_y) + Q_2(T_x, T_y) - Q_3(T_x, T_y) - Q_4(T_x, T_y) \quad (10)$$

$$= Q(T_x, T_y) 4 j \cos\left(\frac{2\pi}{\lambda} T_x D_x\right) \sin\left(\frac{2\pi}{\lambda} T_y D_y\right).$$

The azimuth monopulse ratio, $m_A$, and the elevation monopulse ratio, $m_E$, are calculated in accordance with the following equations by monopulse ratio former 34.

$$m_A = \frac{\Delta_A(T_x, T_y)}{\sum(T_x, T_y)} = \quad (11)$$

$$\frac{Q(T_x, T_y) j 4 \sin\left(\frac{2\pi}{\lambda} T_x D_x\right) \cos\left(\frac{2\pi}{\lambda} T_y D_y\right)}{Q(T_x, T_y) 4 \cos\left(\frac{2\pi}{\lambda} T_x D_x\right) \cos\left(\frac{2\pi}{\lambda} T_y D_y\right)} = j \tan\left(\frac{2\pi}{\lambda} T_x D_x\right)$$

$$m_E = \frac{\Delta_E(T_x, T_y)}{\sum(T_x, T_y)} = \quad (12)$$

$$\frac{Q(T_x, T_y) j 4 \cos\left(\frac{2\pi}{\lambda} T_x D_x\right) \sin\left(\frac{2\pi}{\lambda} T_y D_y\right)}{Q(T_x, T_y) 4 \cos\left(\frac{2\pi}{\lambda} T_x D_x\right) \cos\left(\frac{2\pi}{\lambda} T_y D_y\right)} = j \tan\left(\frac{2\pi}{\lambda} T_y D_y\right)$$

In an exemplary embodiment of the invention, adaptive processing techniques are implemented to reduce interference due to jamming. Various adaptive processing techniques may be implemented depending upon the number of available antenna element data. Examples of adaptive processing techniques include a main auxiliary adaptation technique, an adaptive—adaptive processing technique, and a fully adaptive array technique.

In an exemplary embodiment of the invention, gain at the center of the main beam is maintained during the application of each of these techniques. In the main auxiliary adaptation technique, main beam and auxiliary beams (beams having approximately omnidirectional beam patterns and relatively low gain) are formed from available array elements, which are capable of being shared among multiple beams. The auxiliary beams are used to cancel the sidelobe jamming in the sum beam.

In the adaptive—adaptive processing technique, the auxiliary beams are steered in the direction of the jammers. As is the case in the main auxiliary adaptation technique, the auxiliary beams are used to cancel jamming in the sum beam. In the fully adaptive array technique, all elements of the array are used to cancel jamming while the sum beam is formed from all elements of the array.

For example, in the context of fully adaptive array processing, in which all antenna element data are available, the adaptive processing can be formulated using the sub-array degrees of freedom (i.e., the number of elements available in the sub-array) to cancel jamming subject to the constraint of sub-array bore-sight gain. To reduce jammer interference, the jammer power is minimized. To reduce jammer interference and maintain target detection, jammer power is minimized subject to a constraint of maintaining sub-array boresight gain. Jammer power is given by the equation:

$$J_1 = W_1^H R_{11} W_1, \quad (13)$$

where $J_1$ is the received power of the jammer, $W_1$ is the adaptive weight for sub-array number 1, and $R_{11}$ is the covariance matrix measurement of the first sub-array, and the superscript H indicates the complex conjugate transpose. The constraining equation is:

$$S_1^H W_1 = g_1, \qquad (14)$$

where $S_1$ is the sub-array steering vector, and $g_1$ is the bore-sight sub-array gain. Thus, combining equations (13) and (14) results in the following equation represent jammer power subject to the constraint of maintaining sub-array boresight gain.

$$J_1 = W_1^H R_{11} W_1 - \alpha(S_1^H W_1 - g_1), \qquad (15)$$

where $\alpha$ is the LaGrange multiplier for constrained optimization.

Minimizing equation (15) with respect to $W_1$ (e.g., equating the first derivative of $J_1$ with respect to $W_1$ to zero) and solving for $W_1$ results in the following equation for the adaptive weights for the sub-array, when the constraint of equation (15) is observed.

$$W_1 = \frac{R_{11}^{-1} S_1}{S_1^H R_{11}^{-1} S_1} g_1 \qquad (16)$$

The adaptive weights for the other sub-arrays are derived in a similar manner. Thus, $$W_2 = \frac{R_{22}^{-1} S_2}{S_2^H R_{22}^{-1} S_2} g_2 \qquad (17)$$

$$W_3 = \frac{R_{33}^{-1} S_3}{S_3^H R_{33}^{-1} S_3} g_3 \text{ and} \qquad (18)$$

$$W_4 = \frac{R_{44}^{-1} S_4}{S_4^H R_{44}^{-1} S_4} g_4. \qquad (19)$$

Figure 2:
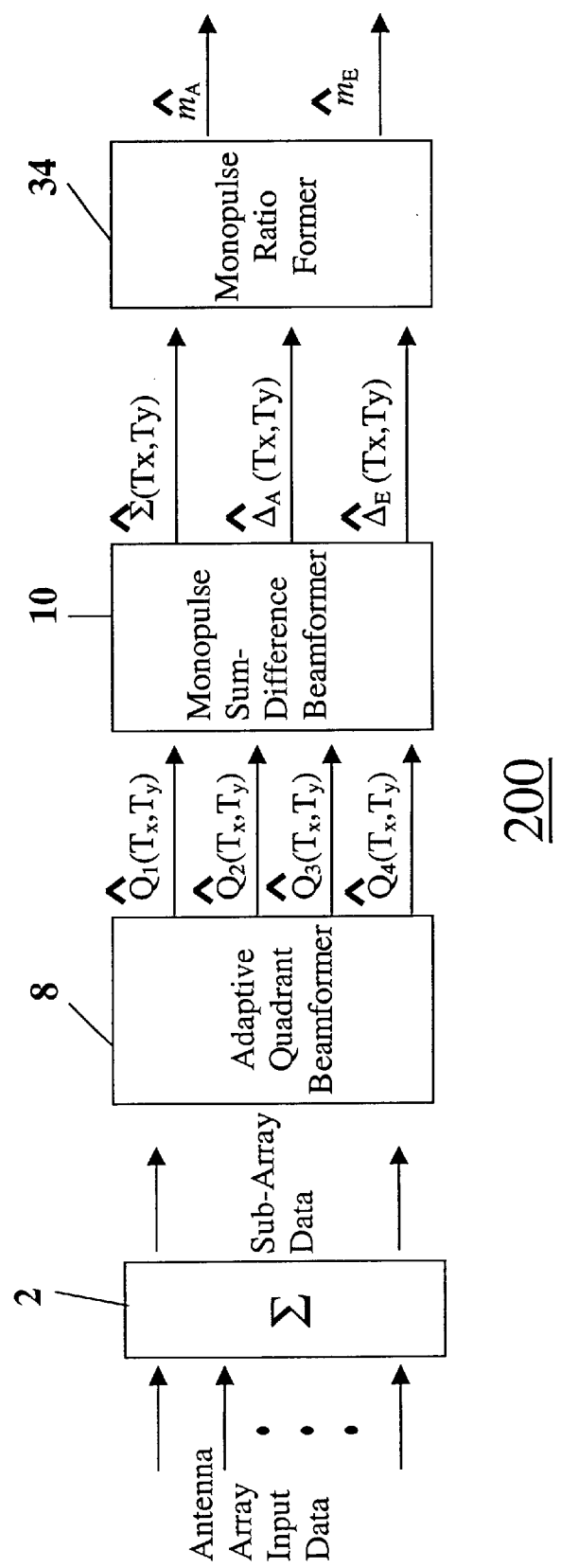
FIG. 2 is a block diagram of an exemplary adaptive digital sub-array beamformer and monopulse sum and difference beamformer, with jamming cancellation and monopulse ratio preservation, in accordance with the present invention.

FIG. 2 is a block diagram of an exemplary system 200 including adaptive digital sub-array beamformer 8 and monopulse processor 34, with jamming cancellation and monopulse ratio preservation, in accordance with the present invention. Antenna element data are formed into sub-arrays by summer 2, and the sub-array data are provided to adaptive sub-array beamformer 8. Adaptive sub-array beamformer 8 forms beam patterns for each sub-array, with nulls adaptively located (steered) to suppress jamming interference. The nulls may be steered in the direction of jamming interference as a result of the adaptation. Adapted of estimated values are represented by placing a circumflex ("^") over the estimated variable or quantity. The adaptive beam pattern formed from elements of each sub-array result in identical nulls responsive to mainlobe or sidelobe jammers. The adaptive sub-array beams can also be related to a common adaptive sub-array beam located at the center of the array ($\hat{Q}(T_x, T_y)$). In the exemplary situation where quadrant beams are formed, the estimated quadrant beams are represented by the following equations.

$$\hat{Q}_1(T_x, T_y) = \hat{Q}(T_x, T_y) e^{\frac{j2\pi}{\lambda}(T_x D_x + T_y D_y)} \qquad (20)$$

$$\hat{Q}_2(T_x, T_y) = \hat{Q}(T_x, T_y) e^{\frac{j2\pi}{\lambda}(-T_x D_x + T_y D_y)} \qquad (21)$$

$$\hat{Q}_3(T_x, T_y) = \hat{Q}(T_x, T_y) e^{\frac{j2\pi}{\lambda}(-T_x D_x - T_y D_y)} \qquad (22)$$

$$\hat{Q}_4(T_x, T_y) = \hat{Q}(T_x, T_y) e^{\frac{j2\pi}{\lambda}(T_x D_x - T_y D_y)} \qquad (23)$$

where equations (20), (21), (22), and (23) are analogous to equations (4), (5), (6), and (7), respectively, wherein the beam patterns represented by equations (20), (21), (22), and (23) are adaptively estimated.

The estimated sub-array beams are provided to the monopulse sum and difference beamformer 10. Monopulse sum and difference beamformer 10 provides estimated sum, and difference beams in elevation and azimuth, $\hat{\Sigma}(T_x, T_y)$, $\hat{\Delta}_E(T_x, T_y)$, and $\hat{\Delta}_A(T_x, T_y)$, respectively, to monopulse ratio former 34. Monopulse ratio former 34 calculates the monopulse ratio in azimuth and elevation in accordance with the following equations. Thus leading to the following undistorted estimated monopulse ratios given by:

$$\hat{m}_A = \frac{\hat{\Delta}_A(T_x, T_y)}{\hat{\Sigma}(T_x, T_y)} = \qquad (24)$$

$$\frac{\hat{Q}(T_x, T_y) j 4 \sin\left(\frac{2\pi}{\lambda} T_x D_x\right) \cos\left(\frac{2\pi}{\lambda} T_y D_y\right)}{\hat{Q}(T_x, T_y) 4 \cos\left(\frac{2\pi}{\lambda} T_x D_x\right) \cos\left(\frac{2\pi}{\lambda} T_y D_y\right)} = j \tan\left(\frac{2\pi}{\lambda} T_x D_x\right),$$

$$\hat{m}_E = \frac{\hat{\Delta}_E(T_x, T_y)}{\hat{\Sigma}(T_x, T_y)} = \qquad (25)$$

$$\frac{\hat{Q}(T_x, T_y) j 4 \cos\left(\frac{2\pi}{\lambda} T_x D_x\right) \sin\left(\frac{2\pi}{\lambda} T_y D_y\right)}{\hat{Q}(T_x, T_y) 4 \cos\left(\frac{2\pi}{\lambda} T_x D_x\right) \cos\left(\frac{2\pi}{\lambda} T_y D_y\right)} = j \tan\left(\frac{2\pi}{\lambda} T_y D_y\right),$$

where $\hat{m}_A$ is the estimated monopulse ratio in azimuth and $\hat{m}_E$ is the estimated monopulse ratio in elevation.

Thus, the jamming is cancelled by the adaptive sub-array beamformer 8, using the spatial degrees of freedom of each sub-array (i.e., the number of available elements in each sub-array) to steer at least one null of each sub-array beam toward the jamming interference. Further, the spatial degrees of freedom across the sub-arrays (i.e., the number of available elements in the total array) are used to form conventional monopulse beams for angle estimation in monopulse sum and difference beamformer 10.

Figure 3:
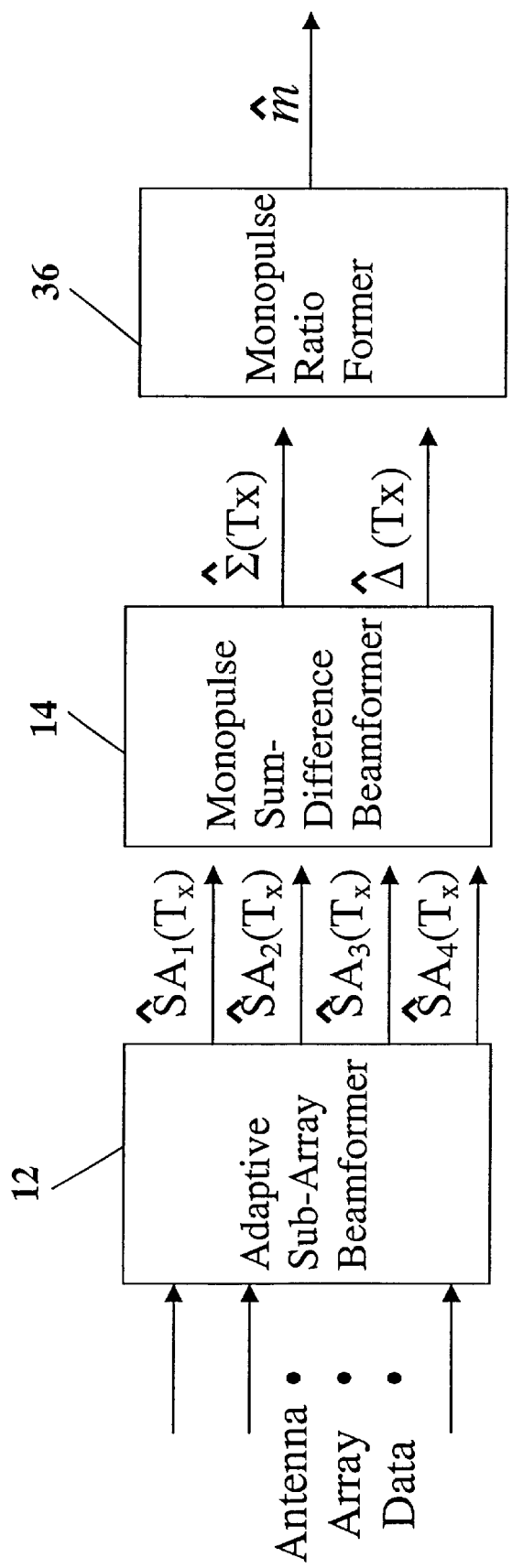
FIG. 3 is a block diagram of an exemplary adaptive digital sub-array beamformer and monopulse sum and difference beamformer, with jamming cancellation and monopulse ratio preservation, for a one-dimensional array, in accordance with the present invention.

FIG. 3 is a block diagram of an exemplary adaptive digital sub-array beamformer and monopulse processor, with jamming cancellation and monopulse ratio preservation, for a one-dimensional array, in accordance with the present invention. Processing for the one-dimensional array is similar to that of the two-dimensional array, except that the beam patterns are in one less dimension in the one-dimensional array implementation than in the two-dimensional array implementation. Also, the estimated adaptive processing is applied to sub-arrays which differ by a linear phase factor. Sub-array data are provided to one-dimensional adaptive sub-array beamformer 12. Estimated sub-array beams (i.e., $\hat{S}A_1(T_x)$, $\hat{S}A_2(T_x)$, $\hat{S}A_3(T_x)$, and $\hat{S}A_4(T_x)$) are formed by one-dimensional adaptive sub-array beamformer 12, in which the nulls are adaptively located to suppress jammer interference. The nulls may be steered in the direction of jamming interference as a result of adaptation. The estimated sub-array beams are provided to monopulse sum and difference beamformer 14. Monopulse sum and difference beamformer 14 forms estimated sum and difference beams (i.e., $\hat{\Sigma}(T_x)$ and $\hat{\Delta}(T_x)$), which are use to calculate the monopulse ratio, $\hat{m}$, in monopulse ratio former 36, in accordance with the following equation. Thus the unbiased monopulse angle estimate is given by the following equation.

$$\hat{m} = \frac{\hat{\Delta}(T_x)}{\hat{\Sigma}(T_x)} = \frac{\hat{S}_A(T_x)j4\sin\left(\frac{2\pi}{\lambda}T_xD_x\right)\cos\left(\frac{2\pi}{\lambda}T_xD_x\right)}{\hat{S}_A(T_x)4\cos\left(\frac{2\pi}{\lambda}T_xD_x\right)\cos\left(\frac{2\pi}{\lambda}T_xD_x\right)} = j\tan\left(\frac{2\pi}{\lambda}T_xD_x\right), \quad (26)$$

where $D_x$ is the distance between the center of the sub array and the center of the array in the x direction, in meters.

A radar processing system and technique utilizing the versatility of digital beamforming to form sub-arrays for canceling jamming interference, and adaptively suppressing jamming interference prior to using conventional deterministic methods (i.e., equations (24) and (25)) to form the sum, $\Sigma$, and difference, $\Delta$, beams for monopulse processing provide the ability to detect a target of interest, provide an undistorted monopulse ratio, m, and maintain target angle estimation, in the presence of multiple mainlobe and multiple sidelobe jammers. Further, this system and technique are not constrained by requiring a priori knowledge of the jamming interference.

Figure 4:
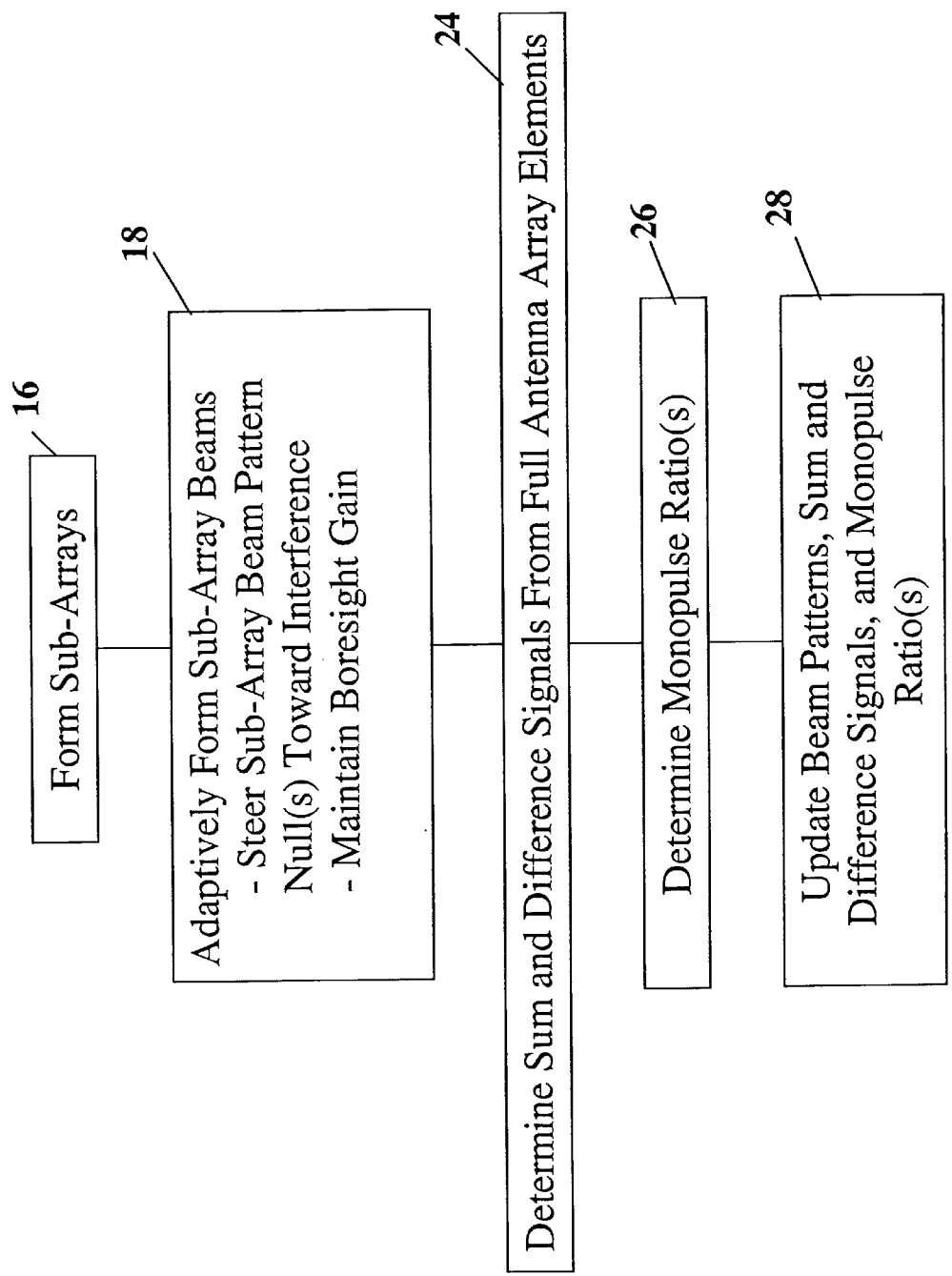
FIG. 4 is a flow diagram of an exemplary process for detecting a target of interest in the presence of multiple mainlobe and sidelobe jammers, in accordance with the present invention.

FIG. 4 is a flow diagram of an exemplary process for detecting a target of interest and maintaining a monopulse ratio in the presence of multiple mainlobe jammers and multiple sidelobe jammers in accordance with the present invention. Sub-arrays are formed using digital beamforming, from the full antenna array in step 16. Antenna array element data are digitally summed to form the sub-arrays. Step 16 may be performed by summer 2 of FIG. 1. The amount that the sub-arrays overlap (share the same antenna element data) is discretionary. Factors to consider when determining which antenna elements are assigned to the various sub-arrays include the desired beamwidth of each sub-array, the degrees of freedom available for adaptive processing, and the impact on monopulse processing performance parameters.

In step 18, sub-array beams are adaptively formed for each sub-array. Each sub-array beam pattern comprises a mainlobe and at least one null. In an exemplary embodiment of the invention, four quadrant sub-arrays are formed. Nulls are adaptively formed to suppress jammer interference by multiplying sub-array element data by the adaptively formed weights formed in accordance with equations (16), (17), (18), and (19). The adaptively formed sub-array beam patterns are in accordance with equations (20), (21), (22), and (23). At least one null of each sub-array beam pattern is adaptively steered toward the jamming interference, while the boresight gain of each sub-array beam pattern is maintained. Monopulse sum, and difference beams in elevation and azimuth, $\hat{\Sigma}(T_x,T_y)$, $\hat{\Delta}_E(T_x,T_y)$, and $\hat{\Delta}_A(T_x,T_y)$, respectively, are determined using the full antenna array element data in step 24. Monopulse ratios are determined in step 26, in accordance with equations (24) and (25), to provide undistorted monopulse ratios $\hat{m}_A$ and $\hat{m}_E$. The monopulse ratios are used to determine the estimated angle of arrival of the target of interest. This may be accomplished through the use of a look up table or from extracting data from a plot of monopulse ratio versus arrival angle. The monopulse ratio is maintained in step 28 by updating the sub-array beam patterns to steer the null(s) toward the jamming interference. The sum and difference beams are recalculated using the updated beam patterns, and updated monopulse ratios are calculated to maintain the accuracy of the estimated arrival angle.

Figure 5:
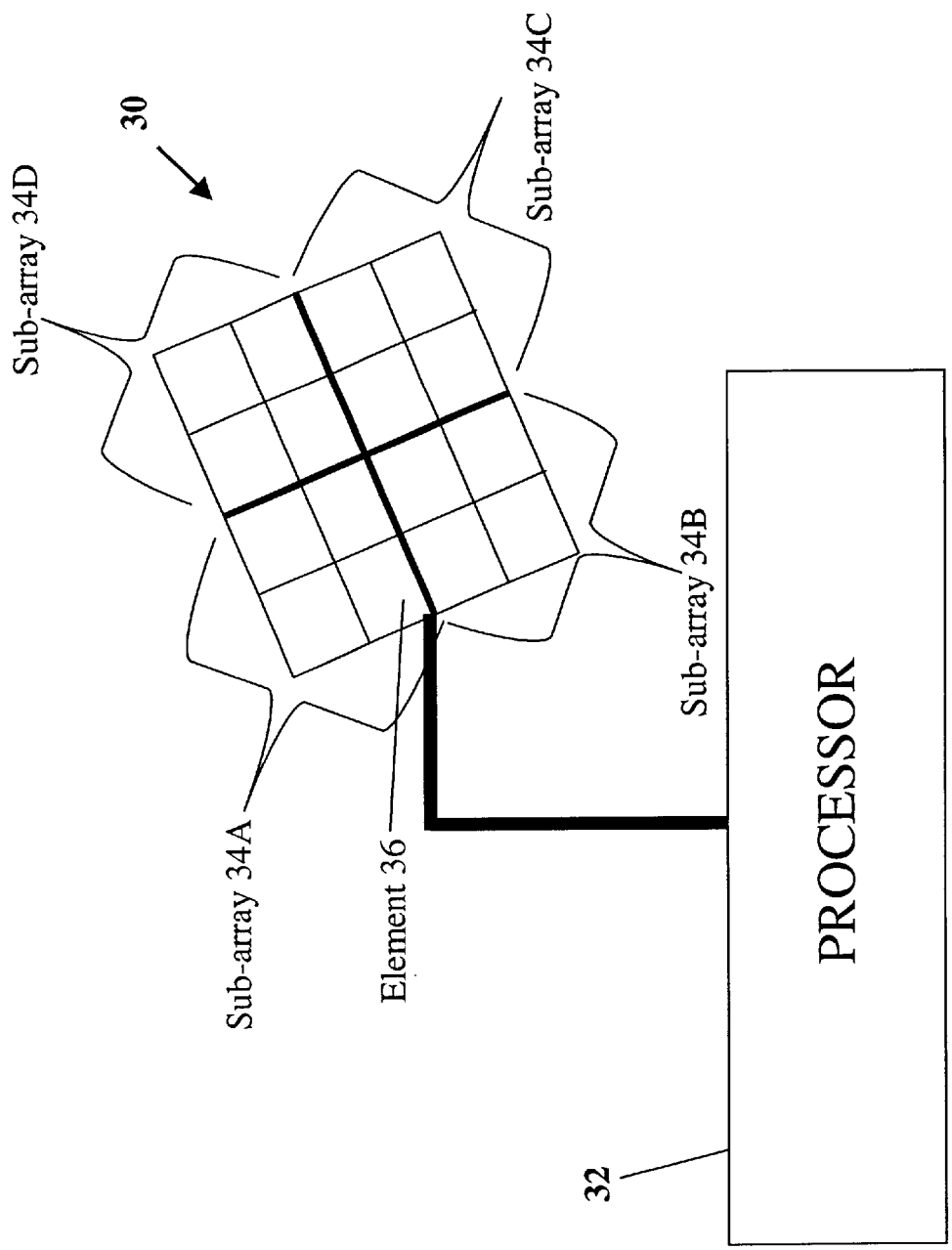
FIG. 5 is a block diagram of an exemplary radar system in accordance with the present invention.

The present invention may be embodied in the form of computer-implemented processes and apparatus for practicing those processes. FIG. 5 is a block diagram of a radar system comprising an antenna array 30 and computer processor 32 in accordance with an exemplary embodiment of the invention. The exemplary array 30 has four sub-arrays 34A, 34B, 34C, and 34D, each sub-array including a plurality of antenna elements 36. Data received by antenna array 30 is transmitted to computer processor 32. Computer processor 32 performs processes for detecting a target of interest and maintaining a monopulse ratio in the presence of multiple mainlobe jammers and multiple sidelobe jammers in accordance with the present invention, as herein described with reference to FIG. 4. Received signal processing may also be performed by special purpose hardware.

The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 32, the computer processor 32 becomes an apparatus for practicing the invention. The present invention may also be embodied in the form of computer program code, for example, whether stored in a storage medium, loaded into and/or executed by computer processor 32, or transmitted over some transmission medium, such as over electrical wiring or cabling, through fiber optics, or via electromagnetic radiation, wherein, when the computer program code is loaded into and executed by computer processor 32, the computer processor 32 becomes an apparatus for practicing the invention. When implemented on a general-purpose processor, the computer program code segments configure the processor to create specific logic circuits.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for detecting a radar target of interest in the presence of multiple radar jamming interference sources, said method comprising the steps of:

forming a plurality of sub-arrays from an antenna array;

digitally beamforming sub-array data from the plurality of sub-arrays and generating quadrant sub-array beams, each with a respective sub-array beam pattern for each of said plurality of sub-arrays, and each quadrant sub-array beam having nulls at identical null positions, said sub-array beams formed having a constraint of maintaining a given boresight gain of each said quadrant sub-array beam;

steering the nulls associated with the quadrant sub-array beams in directions associated with the sources of interference;

determining sum and difference beams from said plurality of sub-array beams for detecting said target of interest;

determining a monopulse ratio based on the sum and difference beams; and estimating an angle of arrival of the target using the monopulse ratio.

2. A method in accordance with claim 1, wherein difference beams are determined in azimuth and elevation.

3. A method in accordance with claim 1, wherein said step of digitally beamforming sub-array data from the plurality of sub-arrays and generating quadrant sub-array beams comprises adaptively forming said sub-array beam patterns.

4. A method in accordance with claim 1 further comprising the step of maintaining an estimated angle of arrival of said target of interest, said step of maintaining comprising:

updating each quadrant sub-array beam to steer a null of each sub-array beam pattern toward an interference source and maintaining a boresight gain of each sub-array beam pattern;

determining updated sum and difference beams from said updated sub-array beams; and determining at least one updated monopulse ratio from said updated sum and difference beams for maintaining an estimated angle of arrival of said target of interest.

5. A radar system for detecting a radar target of interest in the presence of multiple sources of interference, said system comprising:

an antenna array for providing antenna array element data;

a summer for forming a plurality of sub-arrays from said antenna array element data;

a quadrant sub-array beamformer for digitally forming quadrant sub-array beams from said plurality of sub-arrays; wherein each quadrant sub-array beam has a respective beam pattern including nulls at identical null positions, wherein the nulls of each sub-array beam pattern are steered toward the sources of interference;

a monopulse summer for forming sum beams from said quadrant sub-array beams for detecting said target of interest.

6. A radar system in accordance with claim 5, further comprising:

a monopulse difference beamformer for forming at least one difference beam from said sub-array beams; and a monopulse ratio former for determining at least one monopulse ratio from said sum and at least one difference beams for estimating an angle of arrival of said target of interest.

7. A system in accordance with claim 6, wherein difference beams are determined in elevation and azimuth.

8. A system in accordance with claim 5, wherein said sub-array beam patterns are formed having a constraint of maintaining a boresight gain of each sub-array beam.

9. A system in accordance with claim 5, wherein said sub-array beamformer is an adaptive sub-array beamformer for adaptively forming said sub-array beams.

10. A system in accordance with claim 9, wherein said plurality of sub-arrays comprises four sub-arrays each sub-array formed from a different quadrant of said antenna array.

11. A system in accordance with claim 10, wherein each sub-array beam pattern is formed in accordance with the following equations:

$$\hat{Q}_1(T_x, T_y) = \hat{Q}(T_x, T_y)e^{\frac{j2\pi}{\lambda}(T_xD_x+T_yD_y)},$$

$$\hat{Q}_2(T_x, T_y) = \hat{Q}(T_x, T_y)e^{\frac{j2\pi}{\lambda}(-T_xD_x+T_yD_y)},$$

$$\hat{Q}_3(T_x, T_y) = \hat{Q}(T_x, T_y)e^{\frac{j2\pi}{\lambda}(-T_xD_x-T_yD_y)},$$

$$\hat{Q}_4(T_x, T_y) = \hat{Q}(T_x, T_y)e^{\frac{j2\pi}{\lambda}(T_xD_x-T_yD_y)},$$

wherein, $D_x$ is a distance in azimuth between a center of a respective sub-array and a center of said antenna array;

$D_y$ is a distance in elevation between a center of a respective sub-array and said center of said antenna array;

$\lambda$ is a wavelength of transmitted radar energy;

$T_x$ is a directional cosine representing azimuth with respect to said center of said antenna array;

$T_y$ is a directional cosine representing elevation with respect to said center of said antenna array;

$\hat{Q}_1(T_x,T_y)$ is an estimated first quadrant beam located at $(D_x, D_y)$ with respect to said center of said antenna array;

$\hat{Q}_2(T_x,T_y)$ is an estimated second quadrant beam located at $(-D_x, D_y)$ with respect to said center of said antenna array;

$\hat{Q}_3(T_x,T_y)$ is an estimated third quadrant beam located at $(-D_x, -D_y)$ with respect to said center of said antenna array;

$\hat{Q}_4(T_x,T_y)$ is an estimated fourth quadrant beam located at $(D_x, -D_y)$ with respect to said center of said antenna array; and $\hat{Q}(T_x,T_y)$ is an estimated common sub-array factor located at said center of said antenna array.

12. A system in accordance with claim 11, wherein a calculation of monopulse ratios results in the following equations:

$$\hat{m}_A = j\tan\left(\frac{2\pi}{\lambda}T_xD_x\right),$$

$$\hat{m}_E = j\tan\left(\frac{2\pi}{\lambda}T_yD_y\right),$$

wherein, $\hat{m}_A$ is an estimated monopulse ratio in azimuth; and $\hat{m}_E$ is an estimated monopulse ratio in elevation.

13. A computer readable medium having embodied thereon a computer program for detecting a radar target of interest in the presence of multiple sources of interference, the computer readable program comprising:

means for causing a processor to form a plurality of sub-arrays from an antenna array;

means for causing said processor to adaptively form a respective quadrant sub-array beam for each of said plurality of sub-arrays, wherein at least one null of each sub-array beam is steered toward a respective one of the sources of interference and a boresight gain of each sub-array beam pattern is maintained;

means for causing said processor to determine sum and difference beams from said sub-array beams; and means for causing said processor to determine at least one monopulse ratio from said sum and difference beams for detecting a radar target of interest and for estimating an angle of arrival of said target of interest.

14. A computer readable medium in accordance with claim 13, further comprising means for maintaining an estimated angle of arrival of said target of interest, said means for maintaining comprising:

means for updating each quadrant sub-array beam to steer a null of each sub-array beam pattern toward an interference source and to maintain a boresight gain of each sub-array beam pattern;

means for determining updated sum and difference beam patterns from said updated sub-array beams; and means for determining at least one updated monopulse ratio from said updated sum and difference beams for maintaining an estimated angle of arrival of said target of interest.

15. A method for detecting a radar target of interest in the presence of multiple radar jamming interference sources, said method comprising the steps of:

forming a plurality of sub-arrays from an antenna array;

digitally beamforming sub-array data from the plurality of sub-arrays and adaptively generating four quadrant sub-array beams for each of the plurality of sub-arrays using all of the sub-array data elements, each quadrant sub-array beam having a respective sub-array beam pattern and each quadrant sub-array beam having identical nulls and constrained with a given boresight gain;

steering the nulls associated with the quadrant sub-array beams in directions associated with each of the sources of interference;

determining sum and difference beams from said plurality of sub-array beams for detecting said target of interest;

determining a monopulse ratio based on the sum and difference beams; and estimating an angle of arrival of the target using the monopulse ratio.

* * * * *